July 24, 1934.   E. V. TAYLOR   1,967,386
BRAKE
Filed July 19, 1929   2 Sheets-Sheet 1

INVENTOR
*Eugene V. Taylor*
BY *H. O. Clayton*
ATTORNEY

UNITED STATES PATENT OFFICE 1,967,386

BRAKE

Eugene V. Taylor, Chicago, Ill., assignor to Bendix Brake Company, South Bend, Ind., a corporation of Illinois Application July 19, 1929, Serial No. 379,347

9 Claims. (Cl. 188—78)

This invention relates to brakes and is illustrated as embodied in an internal expanding brake.

The principal object of the invention is to provide a brake characterized by an annular band constituting the friction element, adapted to be thrust into drum engagement to apply the brake by a system of levers arranged to effectively distribute the pressure applied to the band.

In one desirable arrangement, a continuous band extending substantially around the inner periphery of the brake drum may be forced simultaneously into drum engagement at a plurality of points on the band surface, preferably by means of a triangularly shaped lever member connected directly or indirectly to the band at its apices. This lever, in effect, constitutes a floating applying element, through which pressure may be applied to at least two areas of the band surface. The triangular lever is preferably actuated by a toggle linkage and may be either directly secured to the band by its two lower apices or may be pivotally connected to thrust links which are in turn pivotally secured to the band.

These features and other desirable details of structure and combinations of parts will become apparent from the following description of certain embodiments of my invention shown in the accompanying drawings, in which.

Figure 1:
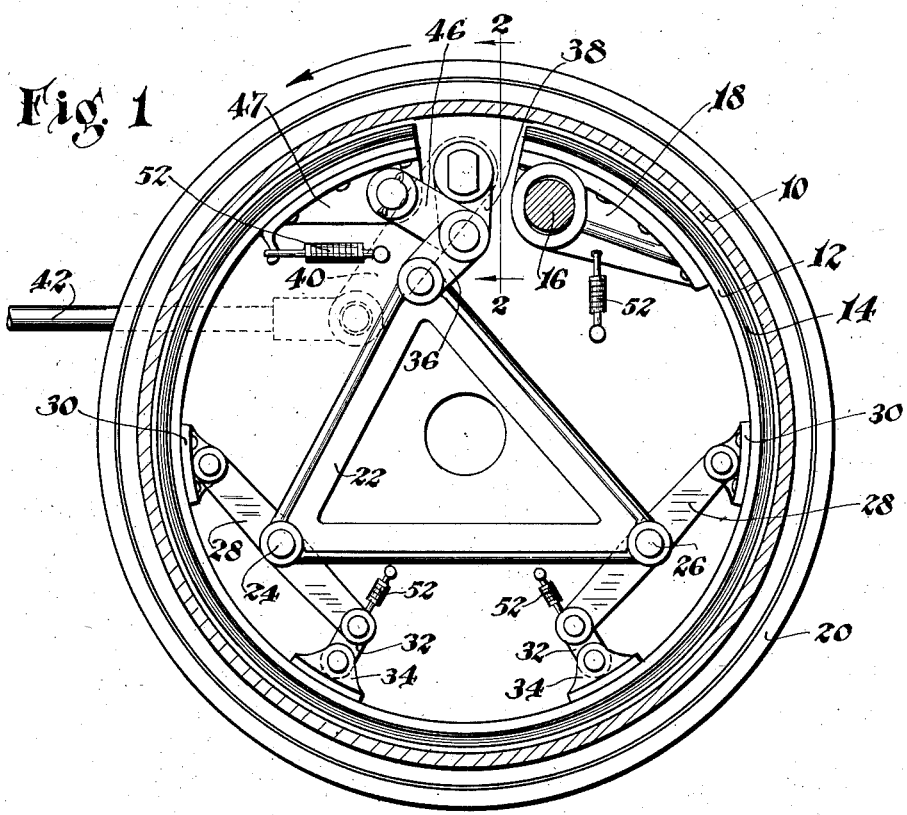
Figure 1 is a vertical section through the brake drum showing in side elevation the applying means for the expanding band brake.
Figure 2:
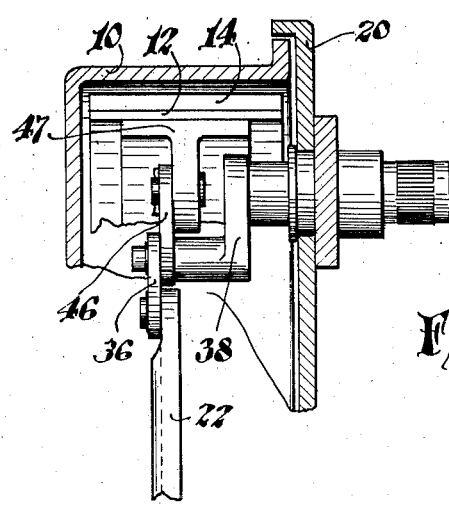
Figure 2 is a transverse section through the brake taken substantially on the line 2—2 of Figure 1, partly broken away and showing in detail a toggle applying mechanism.

In that embodiment of my invention disclosed in Fgures 1 and 2 there is provided a rotatable brake drum 10 within which is mounted a brake mechanism including an outwardly expansible annular band 12 provided with the usual friction lining 14. The annular band may be anchored at one of its ends upon a fixed anchor post 16 positioned in an opening in a web member 18 on the band. With the drum revolving in the direction of the arrow shown in Figure 1, the braking torque is transmitted to the anchor post 16 rigidly secured to the usual closure or backing plate 20 which also serves to support the brake mechanism.

My invention is in its essential feature directed to means for expanding the annual band into drum engagement to apply the brake and preferably includes a triangular lever member 22 pivotally secured at its lower apices 24 and 26 to links 28. These links 28 may have one end pivotally secured to brackets 30 attached to the inner periphery of the band and the other end of each link is preferably pivotally connected to one end of a link 32 the other end of which is pivotally secured to a bracket member 34 similar to bracket 30. The bracket 34 disconnectedly engages the innner surface of the band and is therefore adapted to slide thereon. The upper apex of the triangular bar 22 may be pivotally secured to a compression link 36 forming one link of a toggle actuated by crank arm 38. Arm 38 preferably extends from a shaft journaled in the backing plate 20 and the shaft may be actuated by an arm 40 pivotally secured to a brake pull rod 42 shown in dotted lines in Figure 1.

In operation, a pull on the brake rod 42, connected by suitable transmission linkage to the service pedal of the brake, serves to actuate the arm 38 to move both the compression link 46, the latter pivotally secured to a web member 47 secured to the under side of one end of the brake band and the link 36. With the spreading of the toggle, the band is forced at its end into drum engagement and the triangular lever bar 22 is simultaneously moved downwardly, fulcruming about either pivot 24 or 26, depending upon the resistance of the brake elements.

Assuming that the lever 22 fulcrums at 26, pivot 24 is forced downwardly swinging link 28 in an arc and sliding the bracket 34 on the inner surface of the band, pressure being applied at this point to augment the applying force transmitted to the end of the band by the compression link 46. Inasmuch as the brackets 34 slide on the surface of the band, the lever 22 has an effective floating action and serves, through the intermediary of the toggle, to transmit pressure to the lower portions of the brake band to augment the applying pressure at the end of the band.

Figure 3:
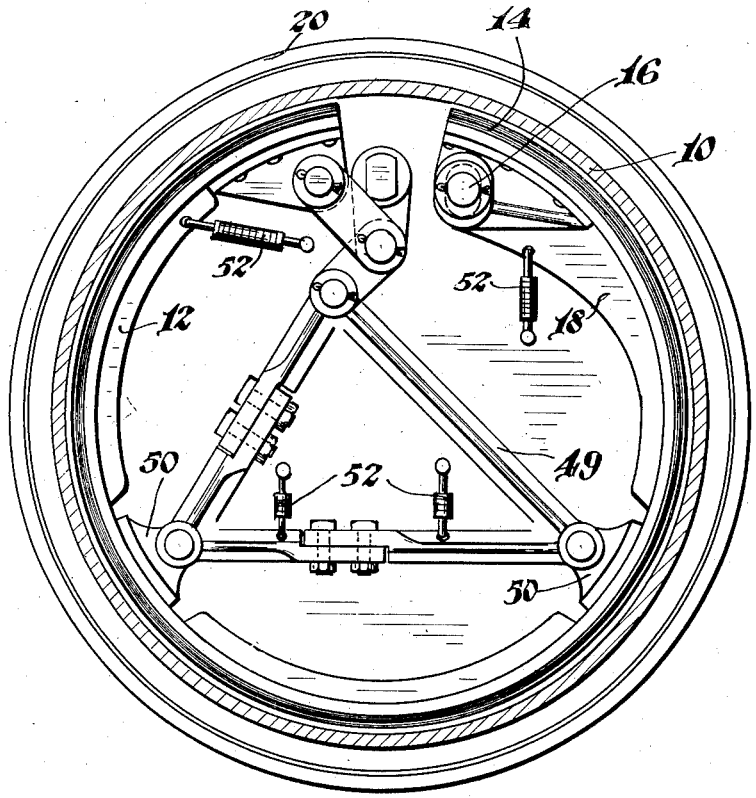
Figure 3 is a view similar to Figure 1 showing a modified form of applying mechanism.

As disclosed in Figure 3, the triangularly shaped lever member may be pivotally secured at its lower apices to brackets 50 slidingly engaging the brake band as shown. At least two of the sides of the triangular lever 49 may be fabricated in two portions and provided with indexed openings to adjust the lengths of the lever arms on the sides of the lever to compensate for wear on the friction surface of the brake band. The applying lever 49 is actuated in the same manner as disclosed in Figure 1 and in both modifications the forces applied to the upper apex of the triangular bar and to the end of the annular band are equal to each other. With both modifications suitable return springs 52, secured to the upper portions of the band and to the links 28 in Figure 1, and to the lower segment of the lever and end of the band in Figure 3, serve to render inoperative the brake, that is, draw the same way from the inner surface of the brake drum upon release of the same.

I claim:

1. A brake comprising, in combination, an annular friction element having separable ends, and means to expand said friction element comprising a triangularly shaped floating lever member adapted to equally distribute applying pressure to the internal surface of said friction element at a plurality of spaced areas on said element.

2. A brake comprising, in combination, a rotatable drum, an annular expanding braking element within said drum, said braking element being thrust into drum engagement with equal force at spaced points on said band by an applying means including a link and a triangular shaped lever.

3. A brake comprising, in combination, a rotatable drum, an annular friction element having separable ends within said drum, means to expand said friction element comprising a triangularly shaped lever member connected to said friction element at two of its apices.

4. A brake comprising, in combination, a rotatable drum, an annular friction element having separable ends within said drum, means to expand said friction element comprising a triangularly shaped lever member connected to said friction element at two of its apices, the third apex of said lever being connected to means for moving said lever into engagement with said element.

5. A brake comprising, in combination, a rotatable drum, an annular expanding brake element within said drum, said braking element being thrust into drum engagement through the intermediary of a triangularly shaped lever member disconnectedly engaging at its lower apices the inner surface of said band.

6. A brake comprising, in combination, a rotatable drum, an annular expanding braking element within said drum, said element being thrust into drum engagement by a triangularly shaped lever member pivotally connected at two of its apices with thrust links, the latter pivotally connected to said braking element.

7. A brake comprising, in combination, a rotatable drum, an annular expanding braking element within said drum, said element being thrust into drum engagement by a triangularly shaped lever member disconnectedly engaging at its lower apices the inner surface of said braking element, two segments of said lever being adjustable as to length.

8. A brake comprising, in combination, a rotatable drum, an annular expanding braking element within said drum, said braking element being thrust into drum engagement by a toggle means, one end of said toggle being directly pivoted to said braking element and the other end thereof being pivotally connected to a lever member pivotally connected to said braking element.

9. A brake comprising, in combination, a drum, an annular expanding friction element within said drum, and means to expand said friction element comprising a lever formed with three legs of substantially equal length joined at their ends to form a triangle.

EUGENE V. TAYLOR.